United States Patent
Chapus et al.

(10) Patent No.: US 7,880,043 B2
(45) Date of Patent: Feb. 1, 2011

(54) METHOD OF CONVERTING FEEDSTOCKS COMING FROM RENEWABLE SOURCES INTO HIGH-QUALITY GAS-OIL FUEL BASES

(75) Inventors: Thierry Chapus, Lyons (FR); Natnalie Dupassieux, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 485 days.

(21) Appl. No.: 11/963,223

(22) Filed: Dec. 21, 2007

(65) Prior Publication Data

US 2008/0161615 A1 Jul. 3, 2008

(30) Foreign Application Priority Data

Dec. 21, 2006 (FR) .................................. 06 11398

(51) Int. Cl.
*C07C 1/00* (2006.01)
*C07C 4/00* (2006.01)

(52) U.S. Cl. ...................... 585/240; 585/14; 585/276

(58) Field of Classification Search ............... 585/240, 585/276, 14; 208/142; 502/66
See application file for complete search history.

(56) References Cited

U.S. PATENT DOCUMENTS

| | | | | |
|---|---|---|---|---|
| 4,992,605 A * | 2/1991 | Craig et al. | ............... | 585/240 |
| 5,705,722 A * | 1/1998 | Monnier et al. | ............. | 585/240 |
| 7,232,935 B2 * | 6/2007 | Jakkula et al. | ............. | 585/240 |
| 7,250,106 B2 * | 7/2007 | Benazzi et al. | ................ | 208/49 |
| 7,491,858 B2 * | 2/2009 | Murzin et al. | ............... | 585/240 |
| 7,540,634 B2 * | 6/2009 | Belek | ......................... | 362/294 |
| 7,540,952 B2 * | 6/2009 | Pinho et al. | .................. | 208/108 |
| 7,550,634 B2 * | 6/2009 | Yao et al. | ..................... | 585/240 |
| 7,626,063 B2 * | 12/2009 | Ghonasgi et al. | ............ | 585/276 |
| 7,691,159 B2 * | 4/2010 | Li | ............................... | 44/605 |
| 2003/0057134 A1 | 3/2003 | Benazzi et al. | | |
| 2004/0138059 A1 | 7/2004 | Euzen et al. | | |
| 2006/0186020 A1 * | 8/2006 | Gomes | ......................... | 208/46 |
| 2007/0006523 A1 * | 1/2007 | Myllyoja et al. | ............. | 44/308 |

FOREIGN PATENT DOCUMENTS

| | | |
|---|---|---|
| EP | 1 396 531 A2 | 3/2004 |
| EP | 1 728 844 A1 | 12/2006 |
| EP | 1 741 767 A1 | 1/2007 |
| EP | 1 741 768 A1 | 1/2007 |
| FI | 100248 * | 10/1997 |
| FR | 2 826 971 A1 | 1/2003 |
| FR | 2 846 574 A1 | 5/2004 |
| WO | WO 2006/100584 * | 9/2006 |
| WO | WO 2007003708 * | 1/2007 |

OTHER PUBLICATIONS

Certified Translation of FI 100248, Aalto et al., Oct. 31, 1997.*

* cited by examiner

*Primary Examiner*—N. Bhat
(74) *Attorney, Agent, or Firm*—Millen, White, Zelano & Branigan, P.C.

(57) ABSTRACT

A hydrotreatment method of treating feedstocks coming from renewable sources, so as to produce gas-oil fuel bases of excellent quality feedstocks, for example, vegetable oils, whether unprocessed or having undergone beforehand a pre-refining step, animal fats, or mixtures of such feedstocks. The feedstocks are subjected to a multistep treatment including hydrodehydrogenating and hydroisomerizing catalysts.

16 Claims, 1 Drawing Sheet

Figure 1:
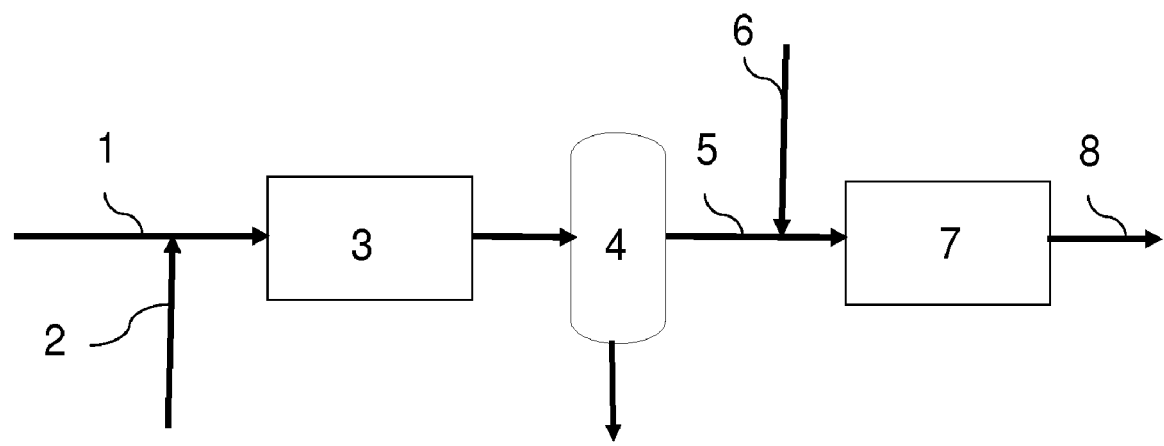

METHOD OF CONVERTING FEEDSTOCKS COMING FROM RENEWABLE SOURCES INTO HIGH-QUALITY GAS-OIL FUEL BASES

CROSS REFERENCE TO RELATED APPLICATION

This application is related to concurrently filed application "Process for the Conversion of Feedstocks Resulting from Renewable Sources for Producing Gas Oil Fuel Bases with a low Sulphur Content and with an Improved Cetane Number," by Chapus et al., claiming priority of French application 06/11.400 filed Dec. 21, 2006.

FIELD OF THE INVENTION

Within an international context marked by the rapid growth in demand for fuels, particularly gas-oil bases in the European Community, the search for new renewable energy sources that can be integrated into the conventional fuel refining and reduction scheme constitutes a major challenge.

In this regard, the integration into the refining process of new plant-based products, derived from the conversion of a lignocellulosic biomass or from the production of vegetable oils or animal fats, has in recent years experienced a very sharp rise in interest because of the increase in the cost of fossil materials. Likewise, conventional biofuels (mainly ethanol and methyl esters from vegetable oils) have achieved a real status as a complement to oil-type fuels within the pools of fuel. Furthermore, the processes known hitherto that use vegetable oils or animal fats are the source of $CO_2$ emissions, known for their negative effects on the environment. Better use of these bioresources, such as for example their integration into the fuel pool, would therefore have a certain advantage.

The strong demand for gas-oil fuels, coupled with environmental concerns, increases the benefit of using feedstocks coming from renewable sources. Among these feedstocks, mention may for example be made of vegetable oils, animal fats, whether unprocessed or having undergone a prior treatment, and mixtures of such feedstocks. These feedstocks contain chemical structures of the triglyceride, ester or fatty-acid type, the structure and the length of the hydrocarbon chain of the latter being compatible with the hydrocarbons present in gas-oils.

One possible approach consists in converting vegetable oil feedstocks by transesterification. Triglycerides, of which feedstocks are essentially composed, are then converted, in the presence of an alcohol and a catalyst, into corresponding esters. Among the drawbacks of this approach may be mentioned: a) the increase in NOx emissions, because of the presence of oxygen in the esters; and b) the rather high boiling point, of around 360° C., which may pose problems in meeting the end-point specifications.

Patent application EP 1 681 337 A describes the conversion of such feedstocks by decarboxylation in order to form paraffins having one less carbon atom than the starting chemical structures. The advantage of this approach as described in the above patent consists in limiting the necessary consumption of hydrogen. However, the yields in terms of gas-oil bases are thereby reduced. The catalysts used are metal catalysts.

U.S. Pat. Nos. 4,992,605 and 5,705,722 describe methods of producing bases for the gas-oil pool that are produced from the direct conversion of vegetable oils (rapeseed oil, palm oil, soya bean oil and sunflower oil) or of a lignocellulosic biomass into saturated hydrocarbons after hydrotreatment or hydrorefining of these products themselves.

The conversion methods described are carried out at pressures of between 0.48 and 1.52 MPa and at temperatures of between 350 and 450° C., making it possible to obtain products with a high cetane number. The pro-cetane additives obtained are mixed with the gas-oil with contents of 5 to 30% by volume.

These two patents have as major drawback a high hydrogen consumption due to the methanization reaction or the water-gas shift reaction. Furthermore, the oxygen contained in the triglycerides is generally decomposed by hydrodeoxygenation in the presence of a hydrotreatment catalyst, this being costly in terms of hydrogen.

SUBJECT OF THE INVENTION

The present invention relates to a continuous method for the conversion of feedstocks coming from renewable sources into gas-oil fuel bases.

The starting feedstocks come from renewable sources, such as oils and fats of vegetable or animal origin, or mixtures of such feedstocks, containing triglyceride and/or fatty acids and/or esters. Among possible vegetable oils, these may be unprocessed or refined, whether completely or partly, and resulting from the following plants: rapeseed, sunflower, soya bean, palm, cabbage palm, olive and coconut, this list not being exhaustive. Among possible fats, mention may be made of all animal fats, such as fat or greases composed of residues from the food industry or coming from the restaurant industry.

The feedstocks thus defined contain triglyceride and/or fatty-acid structures, the fatty chains of which contain a number of carbon atoms between 8 and 25.

The hydrocarbons produced upon converting the starting feedstocks are characterized by:

a) a number of carbon atoms equal to that of the chains of the starting fatty acids, if the mechanism is a hydrogenation mechanism in which the carboxylic group is hydrogenized to an alkyl group;

b) a hydrocarbon chain having one fewer carbon atom than the chains of the starting fatty acids, if the mechanism involved is a decarboxylation/decarbonylation.

It is known from the prior art that the two conversion approaches generally coexist. The method described in the present invention consequently aims to maximize the gas-oil yield and seeks to promote the hydrogenation mechanism described in a). The choice of catalysts and the operating conditions will therefore determine the selectivity to the benefit of hydrogenation, while seeking to limit the hydrogen consumption to the amount strictly necessary, and in particular that which would result in the event of undesirable reactions. Thus, limiting the hydrogen consumption to the amount strictly necessary is achieved by an advantageous combination of the operating conditions and in particular by optimizing the total amount of hydrogen mixed with the feedstock.

The gas-oil bases produced are of excellent quality in that they have:

a low content of sulphur, nitrogen and aromatics;

an excellent cetane number, because of the entirely paraffinic structure of the hydrocarbons formed; and a low density (generally less than 800 kg/m$^3$), this being an advantage insofar as it makes it easier to achieve the density specification for the gas-oil pool, which is at most 845 kg/m$^3$.

SUMMARY OF THE INVENTION

The invention relates to a method of treating a feedstock coming from a renewable source, comprising the following steps:
  a) hydrotreatment in the presence of a fixed-bed catalyst, said catalyst comprising a hydrodehydrogenating function and an amorphous support, at a temperature of between 200 and 450° C., a pressure of between 1 MPa and 10 MPa and an hourly space velocity of between 0.1 $h^{-1}$ and 10 $h^{-1}$ and in the presence of a total amount of hydrogen mixed with the feedstock such that the hydrogen/feedstock ratio is between 70 and 1000 $Nm^3$ of hydrogen/$m^3$ of feedstock; and
  b) separation from the effluent coming from step a) of the hydrogen, gases and at least one gas-oil base.

DESCRIPTION OF THE INVENTION

The present invention is particularly dedicated to the preparation of gas-oil fuel bases corresponding to the latest environmental standards, using feedstocks coming from renewable sources.

These feedstocks consist of a combination of vegetable oils and animal fats, essentially containing triglycerides and fatty acids or esters, with hydrocarbon fatty chains having a number of carbon atoms between 6 and 25. These oils may be palm, cabbage palm, rapeseed, castor and cottonseed oils, groundnut, linseed and sea kale oils, and all oils coming for example from genetically modified or hybridized sunflower or rapeseed. Frying oils and various animal oils, such as fish oils, tallow and lard may be used.

The densities at 15° C. of these oils are between 850 and 970 $kg/m^3$ and their kinematic viscosities at 40° C. are between 20 and 400 $mm^2/s$, more generally between 30 and 50 $mm^2/s$.

These feedstocks are free of sulphur, nitrogen and aromatics or have very low contents thereof: namely sulphur and nitrogen contents typically less than 500 ppm, and aromatic contents of less than 5% by weight.

Advantageously, the feedstock may undergo, prior to step a) of the method according to the invention, a pretreatment or prerefining step so as to remove, by an appropriate treatment, contaminants such as metals, such as alkali metal compounds for example on ion exchange resins, alkali-earth metals and phosphorus. Appropriate treatments may for example be heat treatment and/or chemical treatments well known to those skilled in the art.

Preferably, the optional pretreatment consists of a mild prehydrogenation of said feedstock so as to avoid side reactions of the double bonds. The mild prehydrogenation is advantageously carried out at a temperature of between 50 and 400° C. and at a hydrogen pressure of between 0.1 and 10 MPa and preferably at a temperature of between 150 and 200° C. The prehydrogenation catalyst advantageously comprises metals of Group VIII and/or Group VIB, and preferably the prehydrogenation catalyst is a catalyst based on palladium, platinum, nickel, nickel-molybdenum or based on cobalt-molybdenum, supported by an alumina and/or silica support.

Preferably, prerefined feedstocks are used in the method according to the invention.

Step a): Hydrotreatment of the Feedstock Coming from a Renewable Source

In step a) of the method according to the invention, the optionally pretreated feedstock is brought into contact with a heterogeneous catalyst at a temperature of between 200 and 450° C., preferably between 220 and 350° C., more preferably between 220 and 320° C., and even more preferably between 220 and 310° C. The pressure is between 1 MPa and 10 MPa, preferably between 1 MPa and 6 MPa and even more preferably between 1 MPa and 4 MPa. The hourly space velocity is between 0.1 $h^{-1}$ and 10 $h^{-1}$. The feedstock is brought into contact with the catalyst in the presence of hydrogen. The total amount of hydrogen mixed with the feedstock is such that the hydrogen/feedstock ratio is between 70 and 1000 $Nm^3$ of hydrogen/$m^3$ of feedstock, preferably between 150 and 600 $Nm^3$ of hydrogen/$m^3$ and even more preferably between 150 and 450 $Nm^3$ of hydrogen/$m^3$ of feedstock, this therefore corresponding to an amount of hydrogen added to the present feedstock of at least 0.5% by weight relative to the feedstock.

In step a) of the method according to the invention, at least one fixed hydrotreatment catalyst bed comprising a hydrodehydrogenating function and an amorphous support is used. It would be preferable to use a catalyst whose support is for example chosen from the group formed by alumina, silica, silica-aluminas, magnesia, clays and mixtures of at least two of these minerals. This support might also contain other compounds, for example oxides chosen from the group formed by boron oxide, zirconia, titanium oxide and phosphoric anhydride. Usually an alumina support, better still an η- δ- or γ-alumina is used.

The hydrogenating function is advantageously provided by at least one metal of Group VIII and/or Group VI B.

Said catalyst may advantageously be a catalyst comprising metals from Group VIII, such as for example nickel and/or cobalt, usually used in combination with at least one metal of Group VIB, for example molybdenum and/or tungsten. For example, it is possible to employ a catalyst comprising 0.5 to 10% by weight of nickel oxide (NiO) and preferably 1 to 5% by weight of nickel oxide and 1 to 30% by weight of molybdenum oxide ($MoO_3$), preferably 5 to 25% by weight of molybdenum oxide, on an amorphous mineral support, the percentages being expressed as % by weight relative to the total mass of the catalyst.

The total content of oxides of the metals of Groups VIB and VIII in the catalyst is advantageously between 5 and 40% by weight and preferably between 7 and 30% by weight relative to the total mass of the catalyst.

The weight ratio expressed as metal oxide of metal (or metals) of Group VIB to metal (or metals) of Group VIII is advantageously between 20 and 1 and preferably between 10 and 2.

Said catalyst used in step a) of the method according to the invention must ideally be characterized by a high hydrogenating power so as to direct as far as possible the selectivity of the reaction towards a hydrogenation, maintaining the number of carbon atoms of the fatty chains, so as to maximize the yield of hydrocarbons involved in the gas-oil distillation field. This is why the preferred implementation case is carried out at relatively low temperature. By maximizing the hydrogenating function it is also possible to limit the polymerization and/or condensation reactions resulting in the formation of coke, which would degrade the stability of the catalytic performance. Preferably, a catalyst of the Ni or the NiMo type will be used.

Said catalyst used in hydrotreatment step a) of the method according to the invention may also advantageously contain an element such as phosphorus and/or boron. This element may be introduced into the matrix or preferably be deposited on the support. Silicon may also be deposited on the support, by itself or with phosphorus and/or boron and/or fluorine.

The content by weight of oxide of said element is usually and advantageously less than 20%, preferably less than 10%, and it is usually and advantageously at least 0.001%.

The metals of the catalysts used in hydrotreatment step a) of the method according to the invention are sulphided metals, or metal phases.

A preferred metal catalyst used in hydrotreatment step a) of the method according to the invention has a nickel content of between 20% and 80% by weight, preferably between 55% and 65% by weight. The support of said catalyst is advantageously chosen from the group formed by alumina, magnesium oxide and silica, the support preferably being composed of alumina.

It would not be outside the scope of the present invention to use, in step a) of the method according to the invention, simultaneously or in succession, a single catalyst or several different catalysts. This step may be carried out on an industrial scale in one or more reactors with one or more catalyst beds and with a descending stream of liquid.

Step b): Separation of the Hydrotreated Effluent from Step a)

In step b) of the method according to the invention, the hydrotreated effluent undergoes, at least partly and preferably completely, one or more separations. The purpose of this step is to separate the gases from the liquid, and in particular to recover the hydrogen-rich gases that may also contain gases such as CO and $CO_2$ and at least one liquid gas-oil base having a sulphur content of less than 10 ppm by weight. The water possibly formed during step a) is at least partly separated from the hydrocarbon product. Separation step b) may therefore be followed by a step of removing the water.

The purpose of the optional water removal step is at least partly to eliminate the water produced during the hydrotreatment reactions. The term "water elimination" is understood to mean the elimination of the water produced by the hydrodeoxygenation (HDO) reactions.

More complete elimination of the water may be evisaged in the case in which the effluent coming from step b) is sent onto a hydroisomerization catalyst in a subsequent optional step, depending on the water tolerance of the catalyst. The water may be eliminated by any method or technique known to those skilled in the art, for example by drying, passing over a dessicant, flashing, settling etc.

At least one portion of the liquid gas-oil base obtained from step b) is optionally hydroisomerized in the presence of a hydroisomerization catalyst, described in patent application FR 2 826 971.

A preferred hydroisomerization catalyst comprises 0.05-10% by weight of at least one noble metal of Group VIII and preferably chosen from the group formed by platinum and palladium individually or in combination, which is deposited on an amorphous silica-alumina support (which preferably contains between 5 and 70% by weight of silica and more preferably contains between 22 and 45% by weight of silica) which has a BET specific surface area of 100-500 $m^2/g$, and the catalyst has:

- a mesopore mean diameter of between 1-12 nm;
- a pore volume of the pores having a diameter between the mean diameter as defined above reduced by 3 nm and the mean diameter as defined above increased by 3 nm greater than 40% of the total pore volume;
- a dispersion of the noble metal of between 20-100%; and
- a distribution coefficient of the noble metal of greater than 0.1.

Another preferred hydroisomerization catalyst is described in patent application FR 2 846 574 and comprises:

- at least one hydrodehydrogenating element chosen from the group formed by the elements of Group VIB and Group VIII of the Periodic Table;
- a non-zeolitic support based on silica-alumina containing an amount of silica ($SiO_2$) of greater than 10% by weight and less than or equal to 80% by weight;
- a mean pore diameter, measured by mercury porosimetry, of between 20 and 140 Å;
- a total pore volume, measured by mercury porosimetry, between 0.1 ml/g and 0.6 ml/g;
- a total pore volume, measured by nitrogen porosimetry, of between 0.1 ml/g and 0.6 ml/g;
- a BET specific surface area of between 150 and 500 $m^2/g$,
- a pore volume, measured by mercury porosimetry, in the pores of diameter greater than 140 Å of less than 0.1 ml/g;
- a pore volume, measured by mercury porosimetry, in the pores of diameter greater than 160 Å of less than 0.1 ml/g;
- a pore volume, measured by mercury porosimetry, in the pores of diameter greater than 200 Å of less than 0.1 ml/g, and
- a pore volume, measured by mercury porosimetry, in the pores of diameter greater than 500 Å of less than 0.1 ml/g and preferably of less than 0.01 ml/g.

Preferably, the optional hydroisomerization step is carried out cocurrently.

The operating conditions under which the optional hydroisomerization step is carried out are the following: the temperature is advantageously between 200 and 450° C., preferably between 250° C. and 450° C., more preferably between 300 and 450° C. and even more preferably between 320 and 420° C. The pressure is advantageously between 0.2 et 15 MPa, preferably between 0.5 and 10 MPa and even more preferably between 1 and 9 MPa. The hourly space velocity is advantageously between 0.1 $h^{-1}$ et 10 $h^{-1}$ more preferably between 0.2 and 7 $h^{-1}$ and even more preferably between 0.5 $h^{-1}$ and 5 $h^{-1}$. The hydrogen content is advantageously between 100 and 2000 $Nm^3$ per $Sm^3$ of feedstock and per hour, preferably between 150 and 1500 $Nm^3$ per $Nm^3$ of feedstock.

The hydrogen used for implementing the method comes from an industrial reforming unit.

Treatment and Recycling of the Gases

The hydrogen-containing gas separated in step b) is, if necessary, at least partly treated so as to reduce its CO or $CO_2$ (preferably by scrubbing with at least one amine) before it is recycled into step a).

There is a possibility of adding a certain amount of a sulphur compound, such as DMDS (dimethyl disulphide) to the recycling gas, which compound, by thermal decomposition, produces hydrogen sulphide $H_2S$. This device makes it possible, if necessary, to keep the catalyst in the sulphide state. Advantageously, the amount of sulphur compound introduced is such that the $H_2S$ content in the recycle gas is at least 15 ppm by volume, preferably at least 0.1% by volume or even at least 0.2% by volume.

It may be advantageous to introduce the recycle hydrogen with the feedstock entering step a) and/or in the form of quenching hydrogen between the catalyst beds.

Products Obtained

The product provided by this method has excellent characteristics, thereby giving a gas-oil base of excellent quality:
- its sulphur content is less than 10 ppm by weight;
- its total aromatic content is less than 5% by weight and the polyaromatic content is less than 2% by weight;
- the cetane number is excellent, being greater than 80;
- the density is less than 840 kg/m$^3$, and usually less than 820 kg/m$^3$; and
- its kinematic viscosity at 40° C. is 2 to 8 mm$^2$/s.

The invention also relates to an installation that can be used to implement the method according to the invention.

In FIG. 1, the feedstock coming from renewable sources is fed via the line (1) into the hydrotreatment zone (3) operating in the presence of hydrogen, the hydrogen being introduced via the pipe (2). In the hydrotreatment zone (3), the feedstock is brought into contact with a hydrotreatment catalyst, as described above. The hydrotreated effluent is then introduced into a separation zone (4) so as to separate the gases from the liquids. The hydrogen-rich gases are recovered and discharged, and the liquid gas-oil base fraction is recovered and sent into a subsequent optional hydroisomerization step (7) via the line (5). In FIG. 1, the liquid gas-oil base fraction is introduced, together with a stream of hydrogen via the line (6), into an optional hydroisomerization zone (7) containing a hydroisomerization catalyst as described above.

EXAMPLE

Step a) Hydrotreatment

Introduced into a reactor, temperature-regulated so as to ensure isothermal operation and with a fixed bed charged with 190 ml of a hydrotreatment catalyst based on nickel molybdenum, having a nickel oxide content of 3% by weight and a molybdenum oxide content of 16% by weight and a P$_2$O$_5$ content of 6%, the catalyst being presulphided, were 170 g/h of prerefined rapeseed oil with a density of 920 kg/m$^3$ having a sulphur content of less than 1 ppm, a cetane number of 35 and the composition detailed below:

| Fatty-acid glycerides | nature of the fatty chain | % by weight |
|---|---|---|
| Palmitic | C16:0 | 4 |
| Palmitoleic | C16:1 | <0.5 |
| Stearic | C18:0 | 2 |
| Oleic | C18:1 | 61 |
| Linoleic | C18:2 | 20 |
| Linoleic | C18:3 | 9 |
| Arachidic | C20:0 | <0.5 |
| Gadoleic | C20:1 | 1 |
| Behenic | C22:0 | <0.5 |
| Euruсic | C22:1 | <1 |

300 Nm$^3$ hydrogen/m$^3$ of feedstock were introduced into the reactor, which was maintained at 300° C. and under a pressure of 4 MPa.

Step b): Separation of the Effluent Coming from Step a)

The entire hydrotreated effluent from step a) was separated so as to recover the hydrogen-rich gases and a liquid gas-oil base. 165 g/h of gas-oil base with a density of 790 kg/m$^3$ and a sulphur content of less than 0.5 ppm and a cetane number of greater than 100 were produced.

The method according to the invention therefore makes it possible to obtain a gas-oil base of excellent quality corresponding to the specifications in force.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 06/11.398, filed Dec. 21, 2006, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of treating a feedstock coming from a renewable source, comprising the following steps:
   a) hydrotreatment of said feedstock in the presence of a fixed-bed hydrotreating catalyst, said catalyst comprising at least one metal of group VIII and/or group VIB providing a hydrogenating a function and an amorphous alumina support, at a temperature of between 200 and 450° C., a pressure of between 1 MPa and 10 MPa and an hourly space velocity of between 0.1 h$^{-1}$ and 10 h$^{-1}$ and in the presence of a total amount of hydrogen mixed with the feedstock such that the hydrogen/feedstock ratio is between 150 and 600 Nm$^3$ of hydrogen/m$^3$ of feedstock;
   b) separation from the resultant effluent coming from step a) of the hydrogen, gases and at least one liquid gas-oil base having a sulphur content of less than 10 ppm by weight, and subjecting at least one part of the liquid gas-oil base obtained from step b) to a separate hydroisomerization step in the presence of a hydroisomerization catalyst comprising:
   at least one hydrodehydrogenating element chosen from elements of Group VIB and Group VIII of the Periodic Table;
   a non-zeolitic support based on silica-alumina containing an amount of silica (SiO$_2$) of greater than 10% by weight and less than or equal to 80% by weight;
   a mean pore diameter, measured by mercury porosimetry, of between 20 and 140 Å;
   a total pore volume, measured by mercury porosimetry, between 0.1 ml/g and 0.6 ml/g;
   a total pore volume, measured by nitrogen porosimetry, of between 0.1 ml/g and 0.6 ml/g;
   a BET specific surface area of between 150 and 500 m$^2$/g,
   a pore volume, measured by mercury porosimetry, in the pores of diameter greater than 140 Å of less than 0.1 ml/g;
   a pore volume, measured by mercury porosimetry, in the pores of diameter greater than 160 Å of less than 0.1 ml/g;
   a pore volume, measured by mercury porosimetry, in the pores of diameter greater than 200 Å of less than 0.1 ml/g, and
   a pore volume, measured by mercury porosimetry, in the pores of diameter greater than 500 Å of less than 0.1 ml/g, and with the provision that the hydroisomerization catalyst is different from the hydrotreatment catalyst.

2. A method according to claim 1, in which said feedstock consists essentially of a combination of vegetable oils and animal fats, containing triglycerides and fatty acids or esters, with hydrocarbon fatty chains having a number of carbon atoms between 6 and 25.

3. A method according to claim 1, in which the hydrotreatment step a) is carried out at a temperature of between 220 and 320° C., at a pressure of between 1 MPa and 4 MPa, and with an hourly space velocity of between $0.1\ h^{-1}$ and $10\ h^{-1}$ and in the presence of a total amount of hydrogen mixed with the feedstock such that the hydrogen/feedstock ratio is between 150 and 450 $Nm^3$ of hydrogen/$m^3$ of feedstock.

4. A method according to claim 1, comprising a pretreatment or prerefining step comprising removing alkaline metal, alkaline-earth metal and phosphorus compounds.

5. A method according to claim 1, comprising a pretreatment or prerefining step comprising a mild prehydrogenation of said feedstock carried out at a temperature of between 50 and 400° C. and at a hydrogen pressure of between 0.1 and 10 MPa on a catalyst comprising metals of Group VIII and/or Group VIB and on an alumina and/or silica support.

6. A method according to claim 1, in which separation step b) is followed by a step of eliminating water by drying, by passing over a dessicant, by flashing or by settling.

7. A method according to claim 1, in which the hydroisomerization catalyst comprises 0.05-10% by weight of at least one noble metal of Group VIII, which is deposited on an amorphous silica-alumina support which has a BET specific surface area of 100-500$m^2$/g, and the catalyst has:
 a mesopore mean diameter of between 1-12 nm;
 a pore volume of pores having a diameter between the mean diameter as defined above reduced by 3 nm and the mean diameter as defined above increased by 3 nm greater than 40% of the total pore volume;
 a dispersion of the noble metal of between 20-100%; and
 a distribution coefficient of the noble metal of greater than 0.1.

8. A method according to claim 7, wherein the at least one noble metal from Group VIII is platinum or palladium or a mixture thereof.

9. A method according to claim 7, in which the hydrotreatment step a) is carried out at a temperature of between 220 and 320° C., at a pressure of between 1 MPa and 4 MPa, and with an hourly space velocity of between $0.1\ h^{-1}$ and $10\ h^{-1}$ and in the presence of a total amount of hydrogen mixed with the feedstock such that the hydrogen/feedstock ratio is between 150 and 450 $Nm^3$ of hydrogen/$m^3$ of feedstock.

10. A method according to claim 1, wherein the hydrotreating catalyst comprises both at least one group VIII metal and at least one group VIB metal.

11. A method according to claim 10, wherein said group VIB metal comprises molybdenum and said group VIII metal comprises nickel.

12. A method according to claim 10, in which the hydrotreatment step a) is carried out at a temperature of between 220 and 320° C., at a pressure of between 1 MPa and 4 MPa, and with an hourly space velocity of between $0.1\ h^{-1}$ and $10\ h^{-1}$ and in the presence of a total amount of hydrogen mixed with the feedstock such that the hydrogen/feedstock ratio is between 150 and 450 $Nm^3$ of hydrogen/$m^3$ of feedstock.

13. A method according to claim 11, wherein the hydroisomerizing catalyst comprises tungsten and nickel.

14. A method according to claim 1, wherein the hydrotreatment catalyst comprises nickel.

15. A method of treating a feedstock coming from a renewable source, comprising the following steps:
 a) hydrotreatment of said feedstock in the presence of a fixed-bed hydrotreating catalyst, said catalyst comprising at least one metal of group VIII and/or group VIB providing a hydrogenating a function and an amorphous alumina support, at a temperature of between 200 and 450° C., a pressure of between 1 MPa and 10 MPa and an hourly space velocity of between $0.1\ h^{-1}$ and $10\ h^{-1}$ and in the presence of a total amount of hydrogen mixed with the feedstock such that the hydrogen/feedstock ratio is between 150 and 600 $Nm^3$ of hydrogen/$m^3$ of feedstock;
 b) separation from the resultant effluent coming from step a) of the hydrogen, gases and at least one liquid gas-oil base having a sulphur content of less than 10 ppm by weight, and subjecting at least one part of the liquid gas-oil base obtained from step b) to a separate hydroisomerization step in the presence of a hydroisomerization catalyst comprising:
 0.05-10% by weight of at least one noble metal of Group VIII, which is deposited on an amorphous silica-alumina support which has a BET specific surface area of 100-500$m^2$/g, and the catalyst has:
 a mesopore mean diameter of between 1-12 nm;
 a pore volume of pores having a diameter between the mean diameter as defined above reduced by 3 nm and the mean diameter as defined above increased by 3 nm greater than 40% of the total pore volume;
 a dispersion of the noble metal of between 20-100%; and
 a distribution coefficient of the noble metal of greater than 0.1, and with the provision that the hydroisomerization catalyst is different from the hydrotreatment catalyst.

16. A method according to claim 15, wherein the at least one noble metal from Group VIII is platinum or palladium or a mixture thereof.

* * * * *